United States Patent
Mircescu

(10) Patent No.: US 10,764,169 B2
(45) Date of Patent: Sep. 1, 2020

(54) METHODS, SYSTEMS, AND COMPUTER READABLE MEDIA FOR TESTING VIRTUAL NETWORK COMPONENTS DEPLOYED IN VIRTUAL PRIVATE CLOUDS (VPCS)

(71) Applicant: Keysight Technologies, Inc., Minneapolis, MN (US)

(72) Inventor: Andrei Mircescu, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 269 days.

(21) Appl. No.: 15/729,061

(22) Filed: Oct. 10, 2017

(65) Prior Publication Data

US 2019/0109777 A1    Apr. 11, 2019

(30) Foreign Application Priority Data

Oct. 9, 2017    (RO) .................................. 2017 00803

(51) Int. Cl.
| | |
|---|---|
| H04L 12/26 | (2006.01) |
| H04L 12/46 | (2006.01) |
| H04L 29/08 | (2006.01) |
| H04L 12/24 | (2006.01) |

(52) U.S. Cl.
CPC .......... H04L 43/50 (2013.01); H04L 12/4641 (2013.01); H04L 67/104 (2013.01); *H04L 41/046* (2013.01)

(58) Field of Classification Search
CPC ... H04L 43/50; H04L 67/104; H04L 12/4641; H04L 41/046
See application file for complete search history.

(56) References Cited

U.S. PATENT DOCUMENTS

| | | |
|---|---|---|
| 5,434,848 A | 7/1995 | Chimento, Jr. et al. |
| 6,574,661 B1 | 6/2003 | Delano et al. |
| 6,718,535 B1 | 4/2004 | Underwood |
| 7,089,316 B2 | 8/2006 | Andersen et al. |
| 7,100,195 B1 | 8/2006 | Underwood |
| 7,284,234 B2 | 10/2007 | Steg et al. |
| 7,899,846 B2 | 3/2011 | Flynn et al. |
| 8,316,438 B1 | 11/2012 | Bush et al. |
| 8,458,111 B2 | 6/2013 | Wolf et al. |
| 8,612,599 B2 | 12/2013 | Tung et al. |
| 8,869,107 B2 | 10/2014 | Taylor et al. |
| 9,037,710 B2 | 5/2015 | Gerber et al. |
| 9,043,747 B2 | 5/2015 | Eksten et al. |
| 9,077,760 B2 | 7/2015 | McKeown et al. |
| 9,110,703 B2 | 8/2015 | Santos et al. |

(Continued)

OTHER PUBLICATIONS

Notice of Allowance and Fee(s) Due for U.S. Appl. No. 15/709,433 (dated Aug. 23, 2019).

(Continued)

*Primary Examiner* — Kim Y Nguyen

(57) ABSTRACT

A method for testing a virtual network component deployed in a virtual private cloud (VPC) includes deploying a test agent in a first VPC. The method further includes establishing a VPC peering connection with a device under test (DUT) deployed in a second VPC separate from the first VPC. The method further includes transmitting test traffic from the test agent to the DUT over the VPC peering connection.

21 Claims, 4 Drawing Sheets

(56) References Cited

U.S. PATENT DOCUMENTS

| | | |
|---|---|---|
| 9,154,327 B1 | 10/2015 | Marino et al. |
| 9,276,812 B1* | 3/2016 | Nagargadde ........ H04L 41/0806 |
| 9,471,463 B1 | 10/2016 | Bates et al. |
| 9,575,732 B2 | 2/2017 | Welicki et al. |
| 9,680,728 B2 | 6/2017 | Besser |
| 9,760,928 B1 | 9/2017 | Ward, Jr. et al. |
| 9,818,127 B2 | 11/2017 | Iyoob et al. |
| 9,838,272 B2 | 12/2017 | Djukic et al. |
| 9,875,087 B2 | 1/2018 | Scholz et al. |
| 10,338,958 B1 | 7/2019 | Kamboj et al. |
| 10,534,701 B1 | 1/2020 | Pande et al. |
| 10,541,901 B2 | 1/2020 | Raney |
| 2001/0052013 A1 | 12/2001 | Munguia et al. |
| 2002/0174180 A1 | 11/2002 | Brown et al. |
| 2006/0028999 A1 | 2/2006 | Iakobashvili et al. |
| 2006/0075093 A1 | 4/2006 | Frattura et al. |
| 2008/0201468 A1 | 8/2008 | Titus |
| 2009/0112683 A1 | 4/2009 | Hamilton, II et al. |
| 2011/0004698 A1 | 1/2011 | Wu |
| 2011/0231552 A1 | 9/2011 | Carter et al. |
| 2011/0235991 A1 | 9/2011 | Luthra et al. |
| 2011/0307889 A1 | 12/2011 | Moriki et al. |
| 2012/0079480 A1 | 3/2012 | Liu |
| 2012/0089727 A1 | 4/2012 | Raleigh et al. |
| 2012/0185913 A1 | 7/2012 | Martinez et al. |
| 2012/0191545 A1 | 7/2012 | Leibu et al. |
| 2012/0210318 A1 | 8/2012 | Sanghvi et al. |
| 2013/0031233 A1 | 1/2013 | Feng et al. |
| 2013/0291109 A1 | 10/2013 | Staniford et al. |
| 2013/0305357 A1 | 11/2013 | Ayyagari et al. |
| 2014/0006597 A1 | 1/2014 | Ganguli et al. |
| 2014/0026122 A1 | 1/2014 | Markande et al. |
| 2014/0047272 A1 | 2/2014 | Breternitz et al. |
| 2014/0047342 A1 | 2/2014 | Breternitz et al. |
| 2014/0180664 A1 | 6/2014 | Kochunni et al. |
| 2014/0215443 A1 | 7/2014 | Voccio et al. |
| 2014/0215450 A1 | 7/2014 | Salisbury et al. |
| 2014/0229605 A1 | 8/2014 | Besser |
| 2014/0278623 A1 | 9/2014 | Martinez et al. |
| 2014/0278808 A1 | 9/2014 | Iyoob et al. |
| 2015/0263889 A1 | 9/2015 | Newton |
| 2015/0319030 A1 | 11/2015 | Nachum |
| 2015/0324182 A1 | 11/2015 | Barros et al. |
| 2015/0339107 A1 | 11/2015 | Krishnamurthy et al. |
| 2016/0094418 A1 | 3/2016 | Raney |
| 2016/0110211 A1 | 4/2016 | Karnes |
| 2016/0359888 A1 | 12/2016 | Gupta et al. |
| 2016/0364307 A1 | 12/2016 | Garg et al. |
| 2017/0006135 A1 | 1/2017 | Siebel et al. |
| 2017/0090463 A1 | 3/2017 | Wang |
| 2017/0099195 A1 | 4/2017 | Raney |
| 2017/0118102 A1 | 4/2017 | Majumder et al. |
| 2017/0163510 A1 | 6/2017 | Arora et al. |
| 2017/0171033 A1 | 6/2017 | Lucas et al. |
| 2017/0171034 A1 | 6/2017 | Lucas et al. |
| 2017/0180318 A1 | 6/2017 | Lutas et al. |
| 2017/0180567 A1 | 6/2017 | Sharma et al. |
| 2017/0353351 A1* | 12/2017 | Cheng ................ H04L 12/4641 |
| 2018/0041477 A1 | 2/2018 | Shaposhnik |
| 2018/0096105 A1 | 4/2018 | Bleicher et al. |
| 2018/0176106 A1 | 6/2018 | Raney et al. |
| 2018/0206100 A1 | 7/2018 | Eisner et al. |
| 2019/0044583 A1* | 2/2019 | Garcia ................ H04B 7/0417 |
| 2019/0045008 A1 | 2/2019 | Murthy et al. |
| 2019/0089617 A1 | 3/2019 | Raney |
| 2019/0213326 A1 | 7/2019 | Dykes |
| 2019/0238422 A1 | 8/2019 | Raney |
| 2019/0260651 A1 | 8/2019 | Raney et al. |

OTHER PUBLICATIONS

"Amazon Virtual Private Cloud VPC Peering Guide," Amazon Web Services, Inc., pp. 1-61 (2017).

"IXNETWORK® Virtual Edition (VE) Virtualized Network Performance Testing," Ixia, A Keysight Business, Data Sheet, 915-2901-01-7061 Rev A, www.ixiacom.com, pp. 1-14 (Aug. 2017).

International Search Report and Written Opinion for International Patent Application Serial No. PCT/US2017/063909 (dated Mar. 1, 2018).

Commonly-assigned, co-pending U.S. Appl. No. 15/709,433 for "Methods Systems and Computer Readable Media for Optimizing Placement of Virtual Network Visibility Components" (Unpublished, filed Sep. 19, 2017).

"Kubernetes," Wikipedia, the free encyclopedia, https://en.wikipedia.org/wiki/Kubernetes, pp. 1-6 (Sep. 14, 2017).

"Ixia Cloudlens Private," Ixia, Data Sheet, 915-3736-01-6071 Rev A, pp. 1-15 (Aug. 21, 2017).

"The ABCs of Network Visibility," Ixia, pp. 1-57 (Jul. 5, 2017).

"Ixia Flex TapTM," Ixia, Document No. 915-6813-01 Rev B, pp. 1-5 (Oct. 2015).

"Ixia Phantom vTapTM with TapFlowTM Filtering," Ixia, Document No. 915-6805-01 Rev K, pp. 1-4 (Jul. 2015).

"Ixia xFilterTM," Ixia, Document No. 915-6804-01 Rev E, pp. 1-5 (May 2015).

Hofstede et al., "Flow Monitoring Explained: From Packet Capture to Data Analysis with NetFlow and IPFIX," IEEE Communications Surveys & Tutorials, vol. 16, Issue 4, pp. 2037-2064 (May 12, 2014).

"Managed Detection and Response," esentire, Gartner Press Release, pp. 1-11 (Mar. 14, 2017).

Non-Final Office Action for U.S. Appl. No. 15/709,433 (dated Apr. 8, 2019).

Commonly-assigned, co-pending U.S. Appl. No. 16/251,019 for "Methods, Systems and Computer Readable Media for Triggering On-Demand Dynamic Activation of Cloud-Based Network Visibility Tools," (Unpublished, filed Jan. 17, 2019).

Commonly-assigned, co-pending U.S. Appl. No. 16/219,888 for "Methods, Systems, and Computer Readable Media for Managing Deployment and Mientenance of Network Tools," (Unpublished, filed Dec. 13, 2018).

Notice of Allowance and Fee(s) Due for U.S. Appl. No. 15/709,433 (dated Oct. 18, 2019).

Commonly-assigned, co-pending U.S. Appl. No. 16/653,961 for "Methods, Systems and Computer Readable Media for Providing a Declarative Network Monitoring Environment," (Unpublished, filed Oct. 15, 2019).

Non-Final Office Action for U.S. Appl. No. 16/219,888 (dated Apr. 6, 2020).

Notice of Allowance and Fee(s) Due and Examiner-Initiated Interview Summary for U.S. Appl. No. 16/251,019 (dated May 27, 2020).

* cited by examiner

US 10,764,169 B2

METHODS, SYSTEMS, AND COMPUTER READABLE MEDIA FOR TESTING VIRTUAL NETWORK COMPONENTS DEPLOYED IN VIRTUAL PRIVATE CLOUDS (VPCS)

PRIORITY CLAIM

This application claims the priority benefit of Romanian Patent Application Serial No. a 2017 00803, filed on Oct. 9, 2017, the disclosure of which is incorporated herein by reference in its entirety.

TECHNICAL FIELD

The subject matter described herein relates to network testing virtual network components. More particularly, the subject matter described herein relates to testing virtual network components deployed in VPCs.

BACKGROUND

A virtual private cloud is a pool of computing resources within a public cloud that can be allocated to a cloud user and isolated from other users of the public cloud. When a user desires to test one or more virtual network components that operate within a VPC, one possibility for running the test is to instantiate a test agent within the same VPC as the component being tested (referred to herein as the device under test or (DUT)). However, one problem with deploying a test agent within the same VPC as the component being tested is that VPC resources consumed by the test agent are not available to the device under test. As a result, the presence of the test agent in the same VPC as the DUT can affect results of the test.

Accordingly, there exists a need for an improved method for testing virtual network components deployed in VPCs.

SUMMARY

The subject matter described herein includes methods, systems, and computer readable media for testing virtual network components deployed in virtual private clouds. One method includes deploying a test agent in a first VPC. The method further includes establishing a VPC peering connection with a device under test (DUT) deployed in a second VPC separate from the first VPC. The method further includes transmitting test traffic from the test agent to the DUT over the VPC peering connection.

A system for testing a virtual network component deployed in a virtual private cloud (VPC) includes a test agent configured for deployment in a first VPC. The system further includes a testing as a service VPC peering connection manager for establishing a VPC peering connection with a device under test (DUT) deployed in a second VPC separate from the first VPC. The test agent transmits test traffic to the DUT over the VPC peering connection.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for testing virtual network components deployed in VPCs. In one example, rather than testing a network component using a test agent deployed in the same VPC as a DUT, the subject matter described herein involves deploying a test agent in a VPC separate from the VPC where the DUT resides, establishing a VPC peering connection between the VPCs, and transmitting test traffic to the DUT over the VPC peering connection. Such a test configuration avoids performance impacts on the DUT of deploying the test agent in the same VPC as the DUT.

Figure 1:
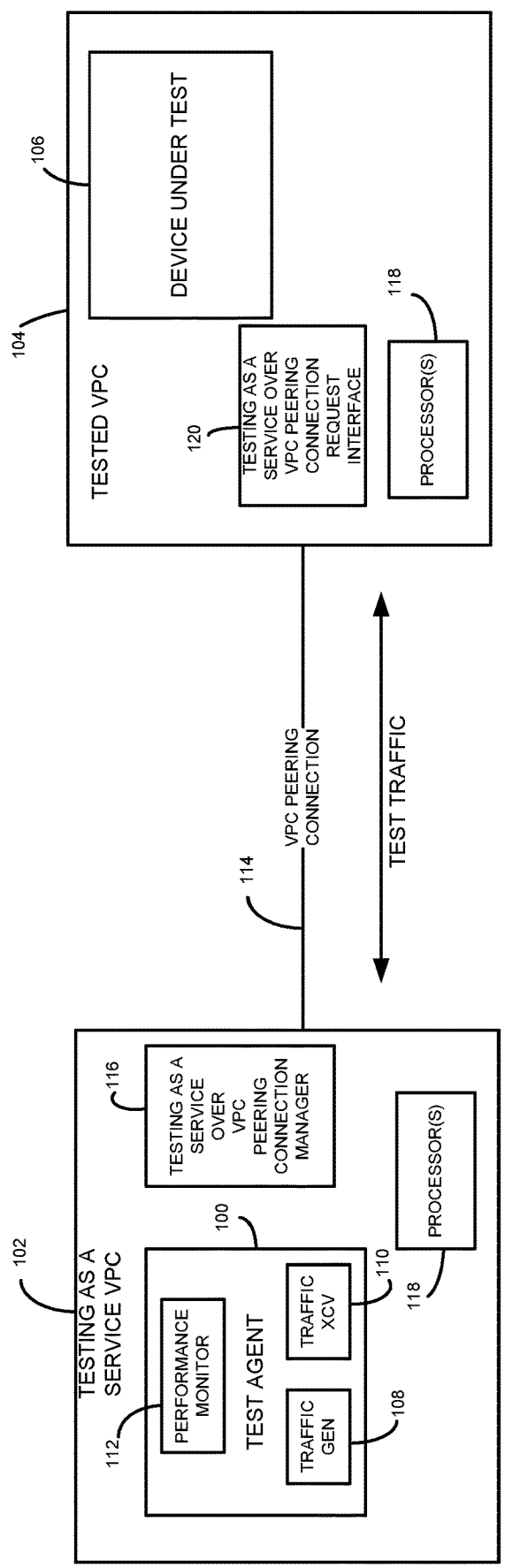
FIG. 1 is a network diagram illustrating an exemplary architecture for testing of a network component over a VPC peering connection.

FIG. 1 is a network diagram illustrating an exemplary architecture for testing of a network component over a VPC peering connection. Referring to FIG. 1, a test agent 100 is deployed in a testing as a service VPC 102 that is separate from a VPC 104 in which a DUT 106 is deployed. Test agent 100 may include a test traffic generator 108 for generating and transmitting test packets to DUT 106, a packet receiver 110 for receiving packets from DUT 106, and a performance monitor 112 for evaluating performance of DUT 106 based on the test packets transmitted to DUT 106 and packets received from DUT 106. In one example, test agent 100 may implement stress testing of DUT 106 by transmitting packets at a configurable rate profile to DUT 106 for a configurable time period. In another example, test agent 100 may emulate a mix of real world applications, such as web browsers, social networking, email, and/or other applications to evaluate performance of DUT 106 under a realistic mix of application traffic.

Because test agent 100 and DUT 106 are located in separate VPCs, a mechanism to carry test traffic to and from DUT 106 needs to be established. In FIG. 1, this mechanism is a VPC peering connection 114. In order to establish VPC peering connection 114, a testing as a service over VPC peering connection manager 116 may be provided in testing as a service VPC 102. Testing as a service VPC peering connection manager 110 may perform steps to establish a VPC peering connection between VPCs 102 and 104. Each of VPCs 102 and 104 may include one or more physical processors 118 for executing the various network components described therein.

In VPC 104 in which DUT 106 resides, to support testing as a service over a VPC peering connection, a testing as a service over VPC peering connection request interface 120 is provided. Testing as a service over VPC peering request interface 120 is a user interface through which a user in tested VPC 104 can request initiation of a VPC peering connection with VPC 102 and also request specific tests to be run over the VPC peering connection. Testing as a service over VPC peering connection request interface 120 may be an application that is provisioned with contact information for testing as a service VPC 102 and with the IP address of testing as a service over VPC peering connection manager 116. As stated above, examples of types of test that can be run over VPC peering connection 114 include stress tests, application traffic emulation tests, or any other type of test that involves the transmission of packet traffic over VPC peering connection 114 to DUT 106.

Figure 2:
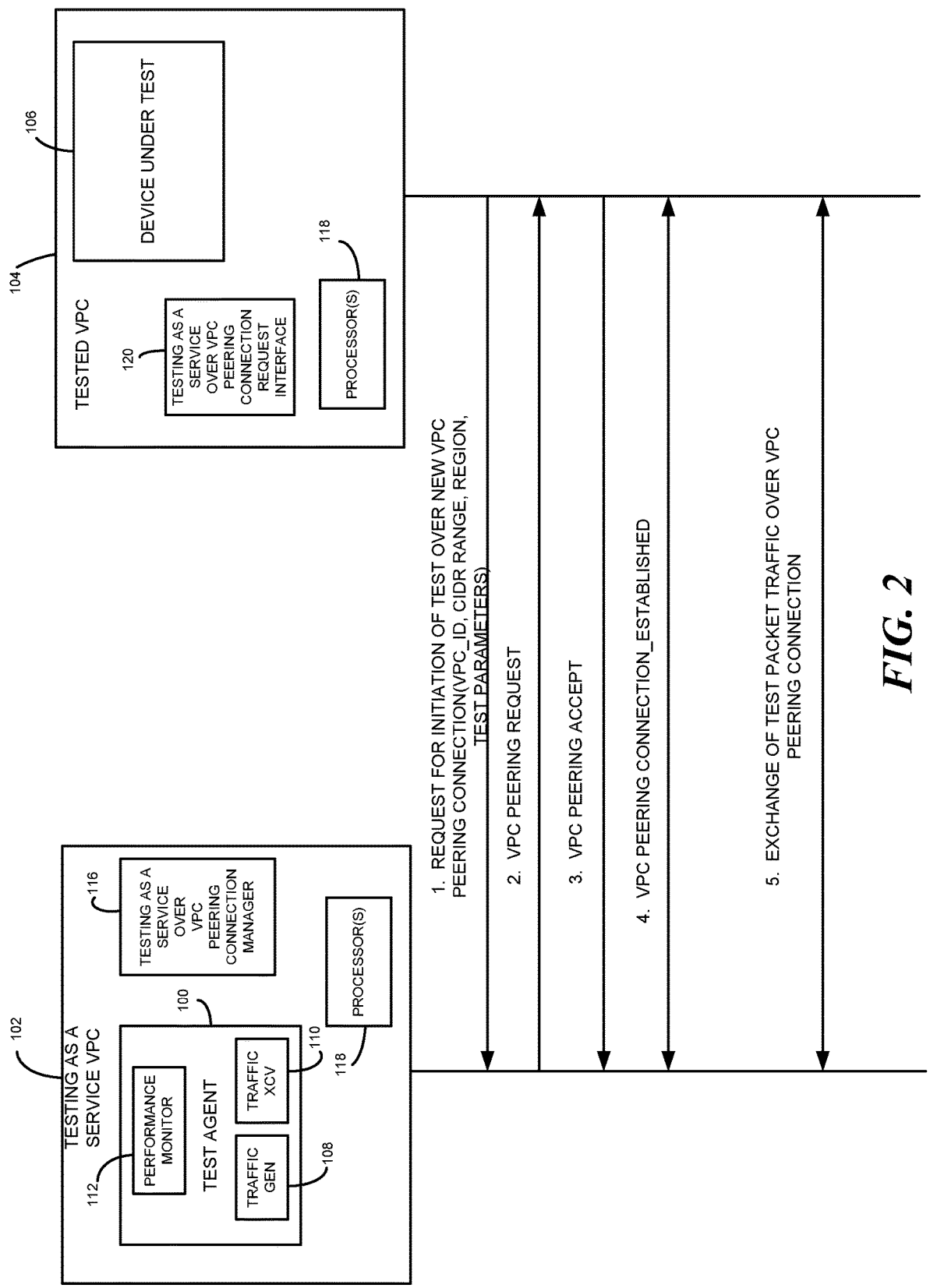
FIG. 2 is a network and message flow diagram illustrating messaging for establishing a VPC peering connection for test purposes.

FIG. 2 is a network and message flow diagram illustrating an exemplary process for establishing a VPC peering connection for the purpose of exchanging test traffic between VPCs. Referring to FIG. 2, in line 1 of the message flow diagram, tested VPC 104 transmits a request for initiation of a test over a new VPC peering connection to testing as a service VPC 102. The request may be initiated by testing as a service over VPC peering connection request interface 120. The request may contain the VPC ID and region of VPC 104. The request may also include the classless inter-domain routing (CIDR) range of VPC 104. The request may also identify the type of test(s) to be performed and the nodes or devices within VPC 104 to be tested. The tests may be identified by a selecting from a predefined menu of tests (stress tests, performance tests, etc.) or configuring a customized test. The nodes to be tested may be identified by IP address and port number or other suitable node identifier.

In line 2 of the message flow diagram, in response to receiving the test initiation request, VPC 102 generates and sends a VPC peering request to VPC 104. The VPC peering request may be generated by testing as a service over VPC peering connection manager 116. The VPC peering request may be addressed to the VPC ID and region extracted from the test initiation request in line 1. Testing as a service over VPC peering connection request interface 120 receives the VPC peering request, and, in this example, accepts the VPC peering request. Accordingly, in line 3 of the message flow diagram, testing as a service request interface 120 transmits a VPC peering accept message to VPC 102.

Testing as a service over VPC connection peering connection manager 116 of VPC 102 receives the VPC peering accept message, and, in response, notifies test agent 100 that the VPC peering connection has been established. In response to receiving notification that the VPC peering connection has been established, test agent 100 may transmit test traffic to DUT 106 over the VPC peering connection. DUT 106 may receive the test traffic and transmit traffic back to test agent 100 over VPC peering connection 114. For example, if DUT 106 is a server, test agent 100 may stress test server by establishing a configured number of connections with the server and request downloads from the server over the connections. Performance monitor 112 may monitor performance of the server by tracking parameters such as latency and throughput of the downloads.

In another example, DUT 106 may be a router. Test agent 100 may have one group of ports that function as traffic sources for transmitting packets to the router and another group of ports that function as traffic destinations for the packets. Test agent 100 may transmit packets to the router over VPC peering connection 114, and the router may route the packets back to test agent 100 over VPC peering connection 114. Performance monitor 112 of test agent 100 may monitor performance parameters, such as latency, throughput, jitter, dropped packets, or other parameters associated with the routed packets.

In yet another example, DUT 106 may be a firewall or a network address translator. In such a case, test agent 100 may have some ports that are configured as traffic sources on a non-protected side of the firewall or NAT and another set of ports that are configured as traffic destinations on a protected side of the firewall or NAT. The traffic source ports may transmit test traffic to the firewall or NAT over VPC peering connection 114, and the traffic destination ports on the protected side of the firewall or NAT may receive the test traffic that passes through the firewall or NAT. Performance monitor 112 may measure performance of the firewall or NAT based on the traffic that is allowed through the firewall or NAT and whether protected IP addresses are appropriately translated.

Figure 3:
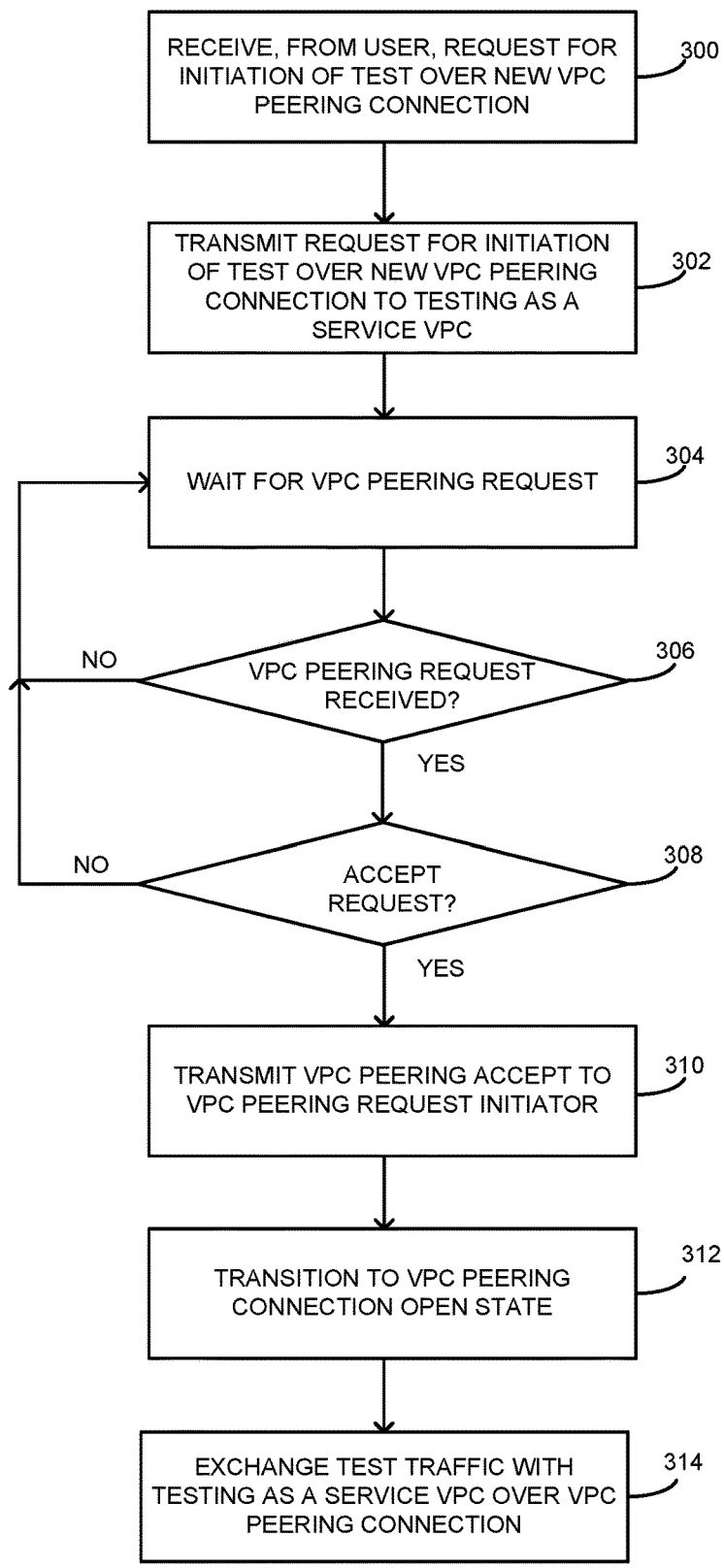
FIG. 3 is a flow chart illustrating an exemplary process performed by a testing over VPC peering connection request interface for requesting initiation of a test over a new VPC peering connection and exchanging test traffic over the connection.

FIG. 3 is a flow chart illustrating exemplary steps that may be performed by testing as a service over VPC peering connection request interface 120 in requesting initiation of a test over a VPC peering connection, establishing the VPC peering connection, and receiving test packets transmitted over the VPC peering connection. Referring to FIG. 3, in step 300, testing as a service over VPC peering connection request interface receives, from the user of tested VPC 104, a request for initiation of a test over a new VPC peering connection. The request may be received via a graphical user interface where the user selects the type of test and configures parameters for the test. Examples of types of tests that may be selected include stress tests, application emulation tests, performance tests, etc. Examples of test parameters that may be configured include number of connections, traffic rate profile, application traffic mix, nodes in VPC 104 that are to be tested, etc. VPC peering may be transparent to the user of VPC 104 in that once the user configures the test parameters, testing as a service over VPC peering connection request interface 120 automatically initiates establishment of the VPC peering connection with testing as a service VPC 102.

In step 302, testing as a service over VPC peering connection request interface 120 transmits a request for initiation of a test over a new VPC peering connection to testing as a service VPC 102. The request may include the VPC_ID, region, and CIDR range of VPC 104. The request may also include the test parameters identifying the nodes to be tested, the type of test, and the configuration parameters for the test. Alternatively, the type of test and test parameters may be communicated to testing as a service VPC 102 after the VPC peering connection is established.

Based on the input received in step 302, testing as a service VPC 102 may initiate a VPC peering request to VPC 104. Accordingly, in step 304 and 306, testing as a service over VPC peering connection request interface 120 waits for the VPC peering request from testing as a service VPC 102. When testing as a service over VPC peering connection request interface 120 receives a VPC peering request, step 308, testing as a service over VPC peering connection request interface 120 determines whether to accept the VPC peering request. Determining whether to accept the request may include checking whether the format of the request is valid, and whether the request originates from a VPC from which initiation of VPC peering was requested. If, in step 310, the VPC peering request is accepted, control proceeds to step 310 where testing as a service over VPC peering connection request interface 120 transmits a VPC peering accept message to the VPC peering request initiator. The VPC peering accept message may be addressed to the VPC that transmitted the VPC peering request message, which in this case is testing as a service VPC 120.

Once testing as a service over VPC peering connection request interface 120 transmits the VPC peering accept message, control proceeds to step 312 where testing as a service over VPC peering connection request interface 120 transitions to the VPC peering connection open state. In the VPC peering connection open state, if the test parameters were previously provided to testing as a service VPC 102, testing as a service over VPC peering connection request interface 120 receives test traffic from test agent 100, forwards the test traffic to DUT 106, receives test traffic from DUT 106 and forwards the test traffic to test agent 100 over VPC peering connection 114 (step 314). If the test parameters were not previously provided to testing as a service VPC 102, testing as a service over VPC request interface 120 may provide the test parameters to the testing as a service VPC 102 and then receive test traffic from testing as a service VPC 102 according to the configured test or tests. The VPC peering connection may remain open until the VPC peering connection is deleted by testing as a service VPC 102 or by testing as a service over VPC request interface 104, or until either of VPCs 102 or 104 is deleted.

Figure 4:
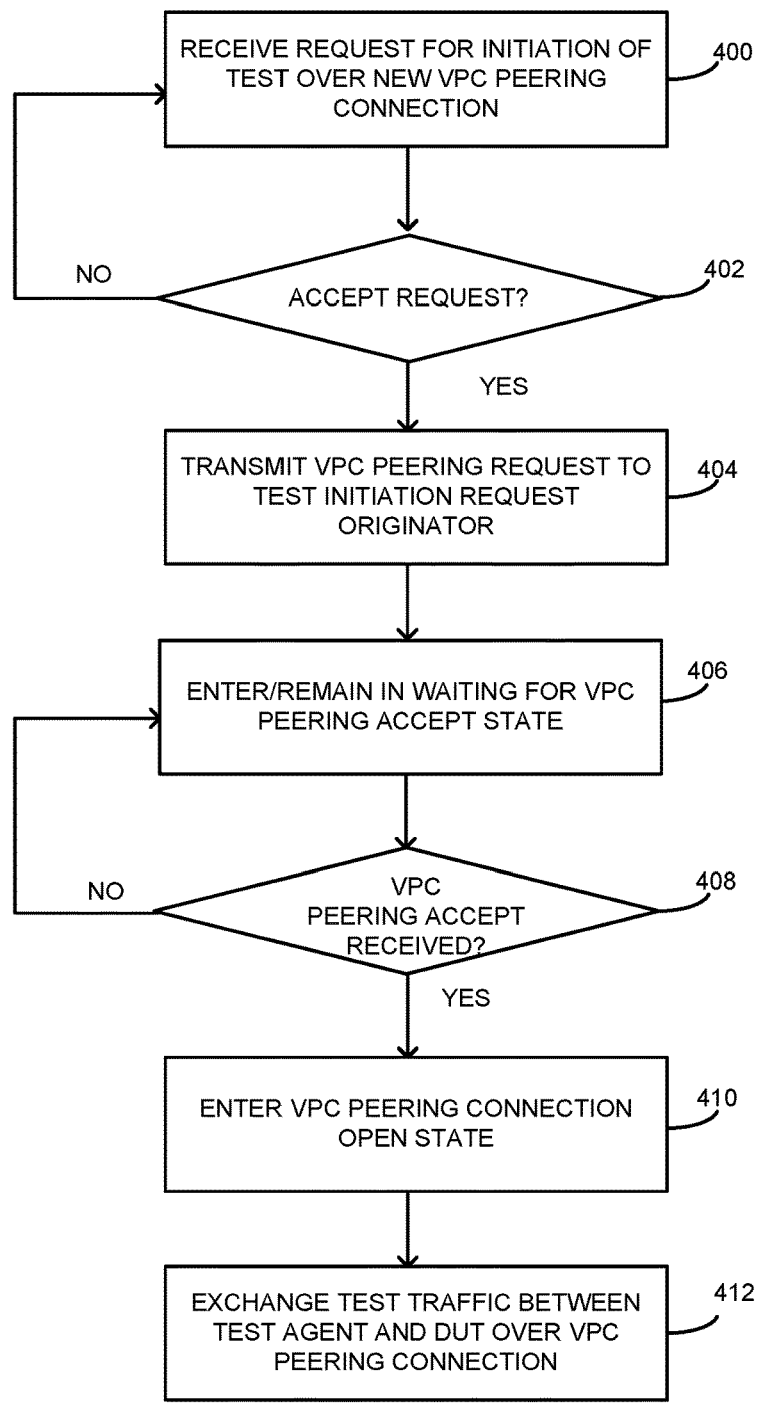
FIG. 4 is a flow chart illustrating exemplary steps performed by a testing as a service VPC connection manager in establishing a VPC connection and exchanging test traffic over the connection.

FIG. 4 is flow chart illustrating an exemplary process implemented by testing as a service over VPC peering connection manager 116 in establishing a VPC peering connection and exchanging test traffic over the connection. Referring to FIG. 4, in step 400, testing as a service over VPC peering connection manager 116 receives a request for initiation of a test over a new VPC peering connection. The request may originate from VPC 104 where they DUT or DUTs reside. The request may include parameters for VPC peering, such as VPC_ID, CIDR, and region. The request may optionally include test parameters. Alternatively, the test parameters may be sent separately from the request to initiate a VPC peering connection.

In step 402, testing as a service over VPC peering connection manager 116 determines whether to initiate VPC peering with the requesting VPC. This determination may be made based on whether the parameters in the request are valid and whether VPC peering is authorized with the requesting VPC.

In the request to initiate VPC peering is accepted, control proceeds to step 404 where testing as a service over VPC peering connection manager 116 transmits a VPC peering request to the originator of the request in step 400. After transmitting the VPC peering request, in step 406 testing as a service VPC peering connection manager 116 enters a waiting for VPC peering accept state. In step 408, testing as a service over VPC peering connection manager 116 determines whether a valid VPC peering accept has been received. If a valid VPC peering accept has not been received, control returns to step 406 where VPC peering connection manager remains in the waiting for VPC peering accept state. If a valid VPC peering accept has been received, control proceeds to step 410 where testing as a service over VPC peering connection manager 116 enters a VPC peering connection open state. In the VPC peering connection open state, testing as a service VPC peering connection manager 116 may notify test agent 100 of the availability of the VPC peering connection, and, in step 412, if the tests are already configured, testing as a service over VPC peering connection manager 116 may exchange test traffic between the test agent and the DUT over the VPC peering connection. If the tests are not already configured, testing as a service over VPC connection manager 116 may receive the test configuration parameters from VPC 104, initiate the requested tests, send test traffic to VPC 104, receive responsive traffic from VPC 104, and monitor test results. As stated above, the VPC peering connection may remain open until deleted by either of the VPCs or until either or both of the VPCs are deleted.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for testing a virtual network component deployed in a virtual private cloud (VPC), the method comprising:
    deploying a test agent in a first VPC for testing a device under test (DUT), which is located in a second VPC;
    establishing a VPC peering connection between the first VPC and the second VPC, which is separate from the first VPC; and
    transmitting test traffic from the test agent to the DUT over the VPC peering connection.

2. The method of claim 1 wherein deploying the test agent in the first VPC includes deploying a test traffic generator in the first VPC.

3. The method of claim 1 establishing the VPC peering connection includes providing a testing as a service request interface in the second VPC for transmitting a request for initiation of a test over the VPC peering connection to the first VPC.

4. The method of claim 3 wherein the request for initiation of the test over the VPC peering connection includes a VPC identifier identifying the second VPC, a classless inter-domain routing (CIDR) range for the second VPC, and a region in which the second VPC is located.

5. The method of claim 3 wherein establishing the VPC peering connection includes providing a testing as a service VPC peering connection manager in the first VPC for receiving the request for initiation of the test over the VPC peering connection and for:
    transmitting a VPC peering request to the second VPC;
    receiving a VPC peering accept message from the second VPC; and,
    in response to receiving the VPC peering accept message, notifying the test agent of successful establishment of the VPC peering connection.

6. The method of claim 5 wherein transmitting the test traffic over the VPC peering connection includes transmitting the test traffic according to test parameter received from the second VPC.

7. The method of claim 6 wherein transmitting the test traffic over the VPC peering connection comprising stress testing the DUT over the VPC peering connection.

8. The method of claim 6 wherein transmitting the test traffic over the VPC peering connection includes emulating real world mix of application traffic over the VPC peering connection.

9. The method of claim 1 comprising receiving traffic from the DUT over the VPC peering connection.

10. The method of claim 9 comprising evaluating performance of the DUT as a function of volume and/or type of the test traffic transmitted to the DUT over the VPC peering connection.

11. A system for testing a virtual network component deployed in a virtual private cloud (VPC), the system comprising:
a test agent configured for deployment in a first VPC to test a device under test (DUT), which is located in a second VPC;
a testing as a service over VPC peering connection manager for establishing a VPC peering connection between the first VPC and the second VPC, which is separate from the first VPC; and
wherein the test agent transmits test traffic to the DUT over the VPC peering connection.

12. The system of claim 11 wherein the test agent includes a test traffic generator.

13. The system of claim 11 comprising a testing as a service over VPC peering connection request interface for transmitting a request for initiation of a test over the VPC peering connection to the first VPC.

14. The system of claim 13 wherein the request for initiation of the test over the VPC peering connection includes a VPC identifier identifying the second VPC, a classless inter-domain routing (CIDR) range for the second VPC, and a region in which the second VPC is located.

15. The system of claim 13 wherein the testing as a service over VPC peering connection manager is configured to receive the request for initiation of the test over the VPC peering connection and to:
transmit a VPC peering request to the second VPC;
receive a VPC peering accept message from the second VPC; and,
in response to receiving the VPC peering accept message, notifying the test agent of successful establishment of the VPC peering connection.

16. The system of claim 15 wherein the test agent is configured to transmit the test traffic to the DUT according to test parameters received from the second VPC.

17. The system of claim 16 wherein the test agent is configured to stress test the DUT over the VPC peering connection.

18. The system of claim 16 wherein the test agent is configured to emulate real world mix of application traffic over the VPC peering connection.

19. The system of claim 11 wherein the test agent is configured to receive traffic from the DUT over the VPC peering connection.

20. The system of claim 19 wherein the test agent is configured to evaluate performance of the DUT as a function of volume and/or type of the test traffic transmitted to the DUT over the VPC peering connection.

21. A non-transitory computer readable medium having stored thereon executable instructions that when executed by a processor of a computer control the computer to perform steps comprising:
deploying a test agent in a first virtual private cloud (VPC) for testing a device under test (DUT), which is located in a second VPC;
establishing a VPC peering connection between the first VPC and the second VPC, which is separate from the first VPC; and
transmitting test traffic from the test agent to the DUT over the VPC peering connection.

* * * * *